United States Patent
Brady

[15] 3,699,155
[45] Oct. 17, 1972

[54] SYNTHESIS OF ALLYL ESTERS WITH PALLADIUM AND PLATINUM HALIDE CATALYSTS

[72] Inventor: Donnie G. Brady, Bartlesville, Okla.
[73] Assignee: Phillips Petroleum Company
[22] Filed: Aug. 11, 1969
[21] Appl. No.: 849,183

[52] U.S. Cl. ........260/491, 260/410.9 N, 260/468 R, 260/469, 260/475 N, 260/476 R, 260/485 N
[51] Int. Cl. ............................................C07c 67/00
[58] Field of Search .....................260/491, 476 R, 260/410.9 N, 485 N, 468 R, 475 N, 469

[56] References Cited

UNITED STATES PATENTS

| | | | |
|---|---|---|---|
| 3,360,548 | 12/1967 | Clark et al. | 260/491 |
| 3,534,087 | 10/1970 | Leftin et al. | 260/491 |
| 3,358,016 | 12/1967 | Kohll et al. | 260/491 |

*Primary Examiner*—Vivian Garner
*Attorney*—Young and Quigg

[57] ABSTRACT

Preparation of allyl esters of carboxylic acids in improved yields by use of palladium and platinum halides as catalysts in the reaction between allyl halides and salts of carboxylic acids.

9 Claims, No Drawings

SYNTHESIS OF ALLYL ESTERS WITH PALLADIUM AND PLATINUM HALIDE CATALYSTS

This invention relates to a method for the preparation of esters of carboxylic acids. In one aspect, it relates to catalysts to improve the reactions of allyl halides with salts of carboxylic and polycarboxylic acids.

Heretofore, it has been recognized that allyl halides react with alkali metal salts of carboxylic acids at elevated temperatures to form the corresponding esters. However, yields in general have been low, conversion rates for the esterification or displacement process have been slow thus requiring excessive residence times in the reactors.

While the reaction of allyl halides with carboxylic acid salts has been a general method of esterification in the teaching of organic chemistry, yet commercial success has been limited awaiting discovery of methods to increase yields with swifter surer reactions. One approach has been to use certain amines and quaternary ammonium halides as catalysts, though with limited effectiveness.

Other methods of esterification often involve multiple steps, or use relatively expensive or difficult to handle reagents such as the acid halides. Most such processes have shortcomings compared to the simplicity and ease of using the direct reaction of an allyl halide with a carboxylic acid salt, if such were substantially improved.

I have discovered that the conversion reaction of an alkali metal hydrocarbon carboxylate or polycarboxylate with an allyl monohalide can be effectively catalyzed by the use of palladium and platinum halide catalysts.

More particularly, I have found my catalyzed esterification reactions to provide improved yields and improved rates of conversion. These results are obtained by the use, as catalysts, of one or more of the palladium halides or platinum halides.

Therefore, it is the object of my process and catalyst to provide for improved preparation of esters of hydrocarbon carboxylic acids. It is a further object of my invention to provide efficient methods for increased yields of allyl esters of hydrocarbon carboxylic acids by the use of palladium or platinum halides as catalysts.

The conversion, esterification, or displacement reaction to which I refer is a reaction between an alkali metal hydrocarboncarboxylate or polycarboxylate containing up to four carboxylate groups, with an allyl monohalide. The reaction can be represented by:

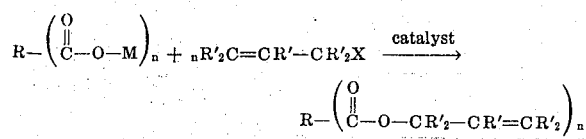

The number of carboxylate groups may range from one to four and is represented by $n$ which also will be the valence of R. M is an alkali metal such as lithium, sodium, potassium, rubidium, or cesium. X is a halogen including fluorine, chlorine, bromine, or iodine. R is H or is alkyl, cycloalkyl, aryl, or alkyl substituted aryl having as many as three alkyl substitutions per aryl group, having in the range of from one to about 20 carbon atoms per R group and having a valence of $n$. R' is hydrogen or alkyl, and up to and including three of the R' radicals can be alkyl and with as many as six carbon atoms in the total of R' groups.

The catalysts of my invention are the dihalides of palladium or platinum, specifically $PdF_2$, $PdCl_2$, $PdBr_2$, $PdI_2$, $PtF_2$, $PtCl_2$, $PtBr_2$, and $PtI_2$. The dihalides of palladium or platinum can be represented by the formula $PdX_2$ or $PtX_2$ wherein X is $F^-$, $Cl^-$, $Br^-$, or $I^-$. These palladium halides can be used singly or as mixtures of two or more.

The equivalent ratio of the alkali metal carboxylate or polycarboxylate to the allyl monohalide is in the range of 0.1:1 to 10:1, and preferably from about 0.5:1 to 5:1 for most advantageous operation. From about 0.1 to 100 moles of catalyst can be employed per 100 moles of carboxylate group, though preferably in the range of about 0.5 to 10 moles per 100 moles of the carboxylate group are employed and result in suitable efficiency and conversion.

Temperatures in the range of from about 0° to about 90° C. are employed in the esterification reaction with the catalyst of my invention. Temperatures within the range of from about 20° to about 80° C are found quite effective. Pressures should be sufficient to maintain the reactants and admixtures thereof substantially completely in the liquid phase, and will usually be in the range of 0.5 to 10 atmospheres. Atmospheric pressure often is a convenience and quite suitable. Reaction time sufficient to effect the degree of conversion should be employed. Normally, reaction times in the range of from about 1 minute to about 24 hours are satisfactory.

Preferably, the conversion should be effected substantially completely in the absence of water, i.e., under essentially anhydrous conditions to minimize undesirable side reactions. However, minor traces of water normally found in the reactants do not interfere unduly.

Upon completion of the desired degree of reaction or conversion, the ester produced can be recovered in any conventional manner. Any of the ordinary techniques known to the art for separation, such as filtration, stripping, solvent extraction, selective precipitation, and the like can be employed as is necessary or convenient.

The esters produced in the process of my invention are valuable products for wide commercial use as solvents, or in lubricating oils, and for subsequent polymerization of esters to the valuable polyesters. The esters can be converted to the epoxy compounds and employed with epoxy resin curing agents to form valuable adhesives, coatings, and the like. Such compositions also can be employed as plasticizers for synthetic resins and the like.

My invention is demonstrated by the following examples which should be considered as illustrative and not as limiting.

EXAMPLE I

To a stirred reactor were added 8.2 g (gram) (0.1 mole) of dry (anhydrous) powdered sodium acetate, 9.2 g (0.12 mole) allyl chloride, 1.8 g (0.01 mole) of palladium chloride, $PdCl_2$, as catalyst, and 50 ml (milliliters) of dimethylformamide as diluent. The mixture was heated to a temperature of 65° C. and maintained at that temperature for approximately 3 hours. The admixture was subsequently cooled to room temperature and filtered.

Analysis of a portion of the filtrate by gas liquid chromatography determined that 79 mole percent of the allyl chloride had been converted to a single product, allyl acetate.

This example demonstrates the synthesis of an allyl hydrocarbon carboxylate in an effective yield in a short reaction time according to the process of my invention using palladium chloride as the catalyst.

EXAMPLE II

The run of Example I was repeated with all conditions the same except that no palladium halide or other catalyst was used. Analysis of a portion of the reaction products by gas liquid chromatography determined that only 20 mole percent of the allyl chloride had been converted to allyl acetate.

Therefore, comparing the results of Example I wherein the reaction employed a palladium chloride as catalyst versus the same reaction in Example II where no catalyst was used shows that the reaction according to my invention resulted in virtually a four-fold increase in production of the allyl ester.

EXAMPLE III

To a stirred reactor were added 8.2 g (0.10 mole) of dry powdered sodium acetate, 10.9 g (0.12 mole) freshly distilled 1-chloro-2-butene, 50 ml of dimethyl formamide as diluent, and 1.8 g (0.01 mole) palladium chloride ($PdCl_2$) as catalyst. The mixture was heated to 65° C. over an interval of about 30 minutes and then maintained at that temperature for 1 additional hour.

Analysis of the mixture by gas liquid chromatography indicated that the theoretical amount, 83 percent, of the 1-chloro-2-butene was converted into two products in a 2:3 ratio. The mixture thereupon was heated for an additional 3.5 hours at 65° C. with the composition ratio of the products remaining the same upon repeat analysis.

The mixture was then cooled in an ice bath and filtered. The filtrate was washed with 50 ml of diethyl ether, and the ether washings were combined with the filtrate. The combined filtrate and ether washings were washed with 100 ml of water, then an additional 25 ml of diethyl ether was added, and the ether layer was again washed with 75 ml of water. The ether layer was then separated, dried over anhydrous magnesium sulfate, and filtered. The ether was distilled off leaving 11.5 g of ester product.

Analysis of the ester product by nuclear magnetic resonance showed a mixture of about a 1:1 mole ratio of 2-butenyl acetate and 1-methylpropenyl acetate. These palladium and platinum catalysts thus show effectiveness to promote esterification, and also that they function as isomerization catalysts.

EXAMPLE IV

The run as described in Example III was repeated under the same reaction conditions with the exception that no catalyst was employed. The conversion of 1-chloro-2-butene was determined by gas liquid chromatography as was done in Example III. After 1.5 hours only 30 percent of the theoretically possible 83 percent of the 1-chloro-2-butene was converted.

The mixture was further treated as described in Example III, and nuclear magnetic resonance analysis determined that a single end product had been formed, 2-butenyl acetate.

Comparison of the runs in Examples III and IV shows that after 1.5 hours the use of palladium halide catalysts resulted in 100 percent conversion against only 30 percent conversion with no catalyst.

EXAMPLE V

To a stirred reactor were added 8.2 g (0.1 mole) of dry powdered sodium acetate, 10.9 g (0.12 mole) of a freshly distilled mixture comprised of 72 mole percent of 3-chloro-1-butene and 28 mole percent of 1-chloro-2-butene, 1.8 g (0.01 mole) of palladium chloride as catalyst, and 50 ml of dimethyl formamide as diluent. This mixture was heated to 65° C., and then maintained at that temperature for approximately 1 hour. Examination of the mixture by gas liquid chromatography indicated that 94 mole percent of the 3-chloro-1-butene and 38 mole percent of the 1-chloro-2-butene had been converted to 2-butenyl acetate (65 mole percent) and 1-methyl-2-propenyl acetate (35 mole percent). A total of 97 mole percent of the theoretical amount of the initial charge of the chlorobutenes had been converted. Heating was continued for 1 additional hour without further change in the reaction mixture composition.

The mixture then was cooled to room temperature and filtered. The filtrate was washed with portions of diethyl ether, and the combined filtrate and ether washings were washed with water, then dried over anhydrous magnesium sulfate. After filtration and stripping of the ether by distillation, the residue was distilled to isolate an end product of 7.4 g (65 mole percent based on the sodium acetate) of 2-butenyl acetate and 1-methyl-2-propenyl acetate mixture.

Example V as described above shows effective preparation of an allyl ester according to the method of my invention. Compared with the results in Example VI, the necessity and effectiveness of the catalyst is clearly shown.

EXAMPLE VI

The run of Example V was repeated except that no catalyst was employed. After a reaction interval of 4.5 hours, gas liquid chromatography indicated that only a trace of acetates had been formed.

Thereupon, to the reaction mixture a total of 1.0 g (0.006 mole) of palladium chloride catalyst was added. After 1 additional hour in the stirred reactor at 65° C., all of the butenyl chloride mixture had been converted to a mixture of 2-butenyl acetate (70 mole percent) and 1-methyl-2-propenyl acetate (30 mole percent). This shows the immediate effectiveness of the catalyst, and that the catalyst need not be added at the initial stages, but can be added subsequently as may be desired or as may be convenient for commercial production purposes.

Examples given in following paragraphs of some of the reactants that can be used according to the process of my invention should not be considered limiting in any way but only illustrative of the compound types effective and useful.

Alkali metal hydrocarbon carboxylates and polycarboxylates which can be employed according to the process of my invention include:

sodium benzoate,
disodium isophthalate,
potassium formate,
lithium acetate,
rubidium decanoate,
cesium-3-methyloctanoate,
potassium cyclopentanecarboxylate,
potassium cyclooctanecarboxylate,
potassium 3-phenylpropanoate,
sodium 4-toluenecarboxylate,
lithium 3,5-xylenecarboxylate,
lithium 2-cyclopentaneacetate,
disodium terephthalate,
disodium phthalate,
tripotassium 1,2,3-benzenetricarboxylate,
trisodium 1,2,4-benzenetricarboxylate,
trilithium 1,2,4-benzenetricarboxylate,
tripotassium 1,3,5-benzenetricarboxylate,
tetrapotassium 1,2,3,4-benzenetetracarboxylate,
tetrasodium 1,2,4,5-benzenetetracarboxylate,
tetrapotassium 1,2,3,5-benzenetetracarboxylate,
disodium 1,8-octanedicarboxylate,
trisodium 1,3,6-hexanetricarboxylate,
disodium 1,4-cyclohexanedicarboxylate,
tripotassium 1,3,6-cyclohexanetricarboxylate,
tetrasodium 1,2,7,8-octanetetracarboxylate,
tetrasodium 1,2,4,5-cyclooctanetetracarboxylate,
sodium cycloeicosanecarboxylate,
sodium eicosanecarboxylate,
sodium 2-naphthalenecarboxylate,
disodium 1,20-eicosanedicarboxylate,
potassium 2,4,6-tributylbenzenecarboxylate,
tetrapotassium 1,10,11,20-eicosanetetracarboxylate,
tetralithium 1,4,8,12-cycloeicosanetetracarboxylate,
tetrapotassium 2,3,6,7-anthracenetetracarboxylate,
tetrasodium 2,3,8,9-anthracenetetracarboxylate
and the like.

Allyl monohalides which can be employed according to the process of my invention include:
3-chloro-1-propene,
3-chloro-1-butene,
1-bromo-2-nonene,
3-iodo-1-propene,
3-bromo-1-propene,
3-fluoro-1-propene,
2-bromomethyl-1-1-octene,
3-iodo-1-nonene,
3-fluoro-2,3-diethyl-1-pentene,
5-chloro-3-ethyl-3-heptene,
5-chloro-4-ethyl-3-heptene,
3-chloromethyl-4-ethyl-3-hexene,
3-bromo-3-propyl-1-hexene,
2-(1-chloropropyl)-1-hexene,
3-chloromethyl-3-octene,
4-iodo-2-methyl-2-octene,
1-fluoro-2-pentene,
2-chloromethyl-1-butene,
3-bromo-1-pentene,
and the like.

It is frequently desirable for the reactions I have described to be effected in the presence of a gas which is substantially completely nonreactive in the reaction environment. Such gases as nitrogen, helium, neon, argon, krypton, ethane and other lower paraffin hydrocarbons, and the like, can be employed.

The conversion or esterification reactions usually are effected in the absence of added diluents, though where desired for various purposes reaction diluents can be employed in amounts which can comprise as much as 95 percent by weight of the reaction medium. Examples of materials which can be suitably employed as diluents include acetone, methyl ethyl ketone, methyl isobutyl ketone, tetrahydropyran, cyclohexanone, benzene, hexane, toluene, tetrahydrofuran, cyclododecanone, N-methylpyrrolidone, sulfolane, ethanol, propanol, butanol, dioxane and dimethylformamide, and the like, and even mixtures if desired.

Reasonable variations and modifications are possible within the scope of my disclosure without departing from the scope and spirit thereof.

That which is claimed is:

1. An esterification process which comprises reacting an alkali metal hydrocarbon carboxylate with at least one allyl monohalide, thereby forming the corresponding allyl carboxylate, wherein said process is conducted with reactants substantially in the liquid phase at a temperature of about 0° – 90° C. and in the presence of an effective amount of catalyst which is at least one palladium halide or platinum halide, of the formula $PdX_2$ or $PtX_2$ wherein X is $F^-$, $Cl^-$, $Br^-$ or $I^-$,
   wherein said alkali metal carboxylate contains up to four carboxylate groups and the hydrocarbon radical of said carboxylate is alkyl, cycloalkyl, aryl or alkyl substituted aryl contains up to about 20 carbon atoms, and
   said allyl monohalide can be represented by $R'C=CR'-CR'X$ wherein each $R'$ is hydrogen or alkyl such that the total of $R'$ radicals contains up to about six carbon atoms, and X is $F^-$, $Cl^-$, $Br^-$, or $I^-$.

2. The process according to claim 1 wherein said alkali metal hydrocarbon carboxylate can be represented by $R-(C-O-M)_n$ wherein M is lithium, sodium, potassium, rubidium, or cesium, the hydrocarbon radical of said carboxylate R is alkyl, cycloalkyl, or alkyl substituted phenyl aryl having from zero to three alkyl substituents per phenyl group and up to about six carbon atoms in all alkyl substituents per phenyl group, and $n$ is an integer of 1 to 4.

3. The process according to claim 1 wherein the ratio of said carboxylate to said allyl monohalide in said process is about 0.1:1 to about 10:1, and the amount of said catalyst employed in said process is about 0.1 to about 100 moles per 100 moles of said carboxylate group.

4. The process according to claim 3 wherein said reaction is conducted at a temperature of about 20° C. to about 80° C., at a pressure of about 0.5 to about 10 atmospheres, and during a time of about 1 minute to about 24 hours.

5. The process of claim 3 wherein said reaction is conducted in the presence of a gas substantially nonreactive to the reactants, and wherein said gas is selected from nitrogen, helium, neon, argon, krypton, xenon, saturated hydrocarbons of from one to about eight carbon atoms, and mixtures thereof.

6. The process of claim 3 wherein said reaction is conducted in the presence of a reaction diluent in an amount up to about 95 percent by weight of the total weight of reactants and wherein said reaction diluent is selected from acetone, methyl ethyl ketone, methyl isobutyl ketone, tetrahydropyran, cyclohexanone, benzene, toluene, xylene, hydrocarbons of from five to about 12 carbon atoms, tetrahydropyran, cyclododecanone, N-methylpyrolidone, sulfolane, alcohols of from two to about seven carbon atoms, dioxane, and mixtures thereof.

7. The process of claim 2 wherein said allyl monohalide is allyl chloride, and said carboxylate is sodium acetate.

8. The process of claim 2 wherein said allyl halide is 1-chloro-2-butene and said carboxylate is sodium acetate.

9. The process of claim 2 wherein said allyl chloride is a mixture of 1-chloro-2-butene and 3-chloro-1-butene and wherein said carboxylate is sodium acetate.

* * * * *